UNITED STATES PATENT OFFICE.

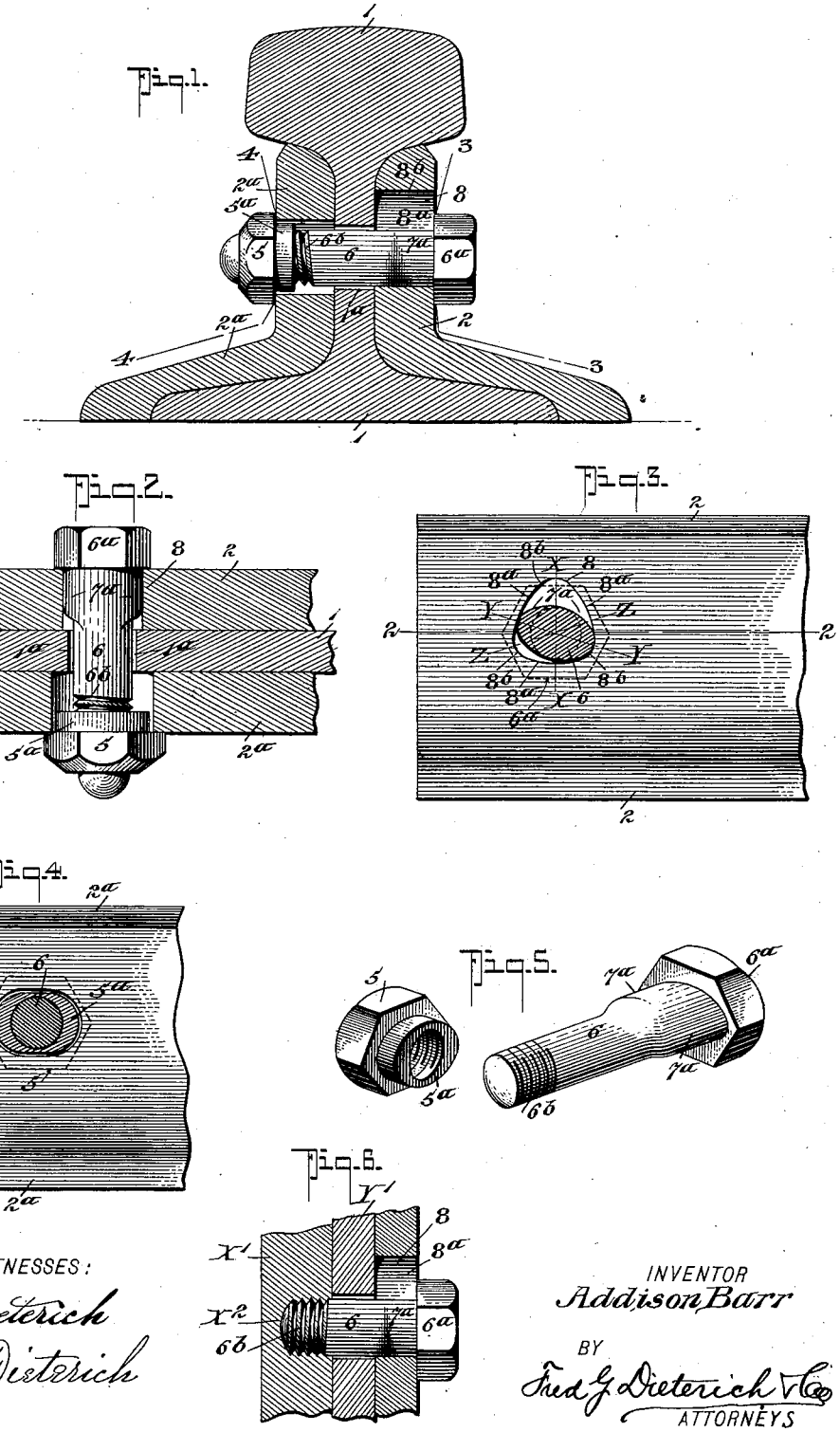

ADDISON BARR, OF MARTIN'S FERRY, OHIO, ASSIGNOR OF ONE-HALF TO WILLIAM MANN, MADDISON ALDRIDGE, AND PATRICK MOORE, OF SAME PLACE.

NUT AND BOLT LOCK.

SPECIFICATION forming part of Letters Patent No. 628,297, dated July 4, 1899.

Application filed April 7, 1899. Serial No. 712,110. (No model.)

*To all whom it may concern:*

Be it known that I, ADDISON BARR, residing at Martin's Ferry, in the county of Belmont and State of Ohio, have invented a new and Improved Lock-Bolt, of which the following is a specification.

This invention, which relates generally to the class of bolt and nut locks, is more particularly in the nature of a novel construction of lock-bolt which is self-securing in its action and in which the use of washer-plates, spring-detents, and other similar devices that are common to the ordinary forms of nut-locks to keep the nuts from loosening is dispensed with.

Primarily this invention seeks to provide a very simple and inexpensive lock-bolt of such character that the same can be easily applied at all places where the ordinary lock-bolt and nut can be used and with but little change in construction of the fish or tie plates.

This invention also comprises, in a lock-bolt, a new device and novel arrangement of the bolt, the nut, and the fish-plates whereby the bolt is made secure and the nut kept from being loosened by the ordinary jarring or vibration of the rail or other parts held secure thereby, the necessity of an extremely tight adjusting of the parts being avoided to effect a proper securing of the rails or other parts to be made fast.

The invention consists in the peculiar and novel construction of the bolt or nut and a tie-plate such as will hereinafter be described in detail and then specifically pointed out in the appended claims, reference being had to the accompanying drawings, in which—

Figure 1 illustrates my invention as applied for use as a lock bolt and nut for joining the ends of railway-rails. Fig. 2 is a horizontal section on the line 2 2 of Fig. 3. Fig. 3 is a vertical section on the line 3 3 of Fig. 1. Fig. 4 is a similar view taken practically on the line 4 4 of Fig. 1. Fig. 5 is a detail view of the bolt detached, and Fig. 6 is a detail view of a modified form of my invention.

In the accompanying drawings I have shown my invention as applied for use as a rail-joint lock-bolt, and when thus applied the bolt and nut are used in connection with a pair of fish-plates; but I desire it understood that my invention is not necessarily limited to the use of two fish-plates, as the same may embody in its complete construction but one fish-plate, as illustrated in Fig. 6 and hereinafter more fully described.

Referring now to the accompanying drawings, in which like letters and numerals represent like parts in all the figures, 1 indicates the rail, and 2 2$^a$ indicate a pair of fish-plates which in their general construction may be of the ordinary kind and have face portions to extend over the foot or bottom members of the rail, as clearly shown in Fig. 1. The web of the rail has the usual apertures 1$^a$, of a somewhat larger diameter than the bolt, to provide for expansion and contraction of the rails and also to permit the bolt to have a slight gyratory play therein. The tie or fish plate 2$^a$ has its bolt-aperture made elongated, (see Fig. 4,) whereby to form seats for the lateral extensions 5$^a$, forming a part of the nut 5, the purpose of which is to hold the nut from turning during the operation of forcing the bolt to its clamping or screwed-home position.

The bolt 6 is of the ordinary construction and has the usual heads 6$^a$ and the threaded ends 6$^b$, it being at a point just inside of its head provided with a lateral enlarged portion, elliptical shape in cross-section, whereby the two opposing bearing-lugs 7$^a$ are provided.

The fish-plate 2, which forms a necessary part of my complete invention, has its bolt-aperture 8 made of a triangular shape, whereby to provide three equispaced bearing-faces 8$^a$, which at their merging points are in the nature of fillets 8$^b$, having the curvatures of the outer or bearing edges of the lugs 7$^a$. The size of the aperture 8 is such relatively to the elliptical shape of the bolt that the bolt member during one complete revolution will pass over three distinct locking positions, (indicated by X, Y, and Z in Fig. 3,) and each of which shows one of the lugs 7$^a$ seated in the fillet 8$^b$ of the opening 8 and the other lug held tightly against the diametrically oppositely disposed bearing-faces 8$^a$.

From the foregoing, taken in connection with the accompanying drawings, it will readily appear that as the greatest distance crosswise of any part of the triangular holes of the fish-plate 2 just equals the extreme length of the cross-sectional line of the elliptical part of the bolt said bolt will turn in the holes; but to do so it must have a gyratory action and shift its position at least three times during one revolution, and as it must rise and fall during its rotation it is manifest that without exterior force the bolt cannot turn, as it is not only held from rotation by the elliptical parts wedging on the triangular openings, but for the reason that the rising and falling of the bolt, particularly when it is driven to its home position, will tend to cause the threaded end of the said bolt to bind in the nut-threads.

In Fig. 6 I have illustrated how the bolt can be used without the nut. In this case the solid part X', to which it is desired to hold fast the part Y', has a threaded socket X².

My invention is extremely simple, and as it requires no spring-washers to hold the nut it can be manufactured at a cost not more than that of the simplest form of bolt and nut locks now in common use.

Having thus described my invention, what I claim, and desire to secure by Letters Patent, is—

1. The combination of the bolt having a threaded end to engage a fixedly-held threaded socket, said bolt having lateral lugs; of a washer or clamp plate having its bolt-aperture formed with triangularly-disposed sides to be engaged by the bolt-lugs and adapted to impart a gyratory movement to the bolt as it is rotated, for the purposes described.

2. The combination with the washer-plate 2ª, having a nut-receiving aperture; the nut having a means for fixedly seating in the aperture of the washer-plate 2ª; a second washer-plate 2, having triangularly-shaped bolt-apertures, and the bolt having a threaded end to engage the nut and having an elliptical enlargement at or near its head, forming equilaterally-projected bearing-lugs, all being arranged substantially as shown and for the purposes described.

ADDISON BARR.

Witnesses:
GEO. G. SEDGWICK,
LUCY M. SEDGWICK.